United States Patent
Huang et al.

(10) Patent No.: US 11,310,690 B2
(45) Date of Patent: Apr. 19, 2022

(54) TRAFFIC SERVICE PRIORITIZATION IN A CONTROLLER BASED MULTI-AP NETWORK

(71) Applicant: QUALCOMM Incorporated, San Diego, CA (US)

(72) Inventors: Xiaolong Huang, San Jose, CA (US); Bharat Bhushan, Fremont, CA (US); Brian Michael Buesker, San Diego, CA (US); Sai Yiu Duncan Ho, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 34 days.

(21) Appl. No.: 16/529,547

(22) Filed: Aug. 1, 2019

(65) Prior Publication Data

US 2020/0045576 A1 Feb. 6, 2020

Related U.S. Application Data

(60) Provisional application No. 62/714,434, filed on Aug. 3, 2018.

(51) Int. Cl.
| | | |
|---|---|---|
| *H04W 28/02* | (2009.01) | |
| *H04W 80/02* | (2009.01) | |
| *H04L 41/046* | (2022.01) | |
| *H04W 28/12* | (2009.01) | |

(52) U.S. Cl.
CPC ....... *H04W 28/0268* (2013.01); *H04L 41/048* (2013.01); *H04W 28/12* (2013.01); *H04W 80/02* (2013.01)

(58) Field of Classification Search
None
See application file for complete search history.

(56) References Cited

U.S. PATENT DOCUMENTS

| | | | | |
|---|---|---|---|---|
| 2006/0104232 A1* | 5/2006 | Gidwani | ............... | H04W 28/18 370/328 |
| 2007/0081455 A1* | 4/2007 | Kashima | ............... | H04W 28/02 370/229 |
| 2011/0110266 A1* | 5/2011 | Li | ............ | H04W 56/00 370/253 |
| 2011/0222520 A1* | 9/2011 | Montemurro | ....... | H04W 74/006 370/338 |
| 2015/0230275 A1* | 8/2015 | Kerpez | ............. | H04W 72/0406 370/329 |
| 2016/0143026 A1* | 5/2016 | Seok | .................... | H04W 72/046 370/329 |
| 2017/0093685 A1* | 3/2017 | Retana | .................... | H04L 45/02 |
| 2018/0227812 A1* | 8/2018 | Nagasaka | ............. | H04W 24/10 |
| 2018/0249406 A1* | 8/2018 | Tellado | ............... | H04L 47/2491 |
| 2018/0331828 A1* | 11/2018 | Pakkan | .............. | H04L 41/0876 |

* cited by examiner

*Primary Examiner* — Adnan Baig
(74) *Attorney, Agent, or Firm* — Holland & Hart LLP

(57) ABSTRACT

Certain aspects relate to methods and apparatus for traffic flow service prioritization in a multi AP (MAP) network.

27 Claims, 14 Drawing Sheets

| Field | Length | Value | Description |
|---|---|---|---|
| tlvType | 1 octet | TBD | Traffic Service Prioritization Policy TLV. |
| tlvLength | 2 octets | Variable | Number of octets in ensuing field. |
| tlvValue | 4 octetS | Variable | Traffic-Flow-ID |
| | 2 octets | Variable | Traffic Classifier fields<br><br>Traffic Flow Classifier Bitmap<br>Bit-0: if set 1, VLAN VID is included as a classifier.<br>Bit-1: if set to 1, IPv4/v6 DS field is included as a classifier.<br>Bit-2: if set to 1, IPv4 Source IP is included as a classifier, shall be set to 0 if the TLV is not for uplink traffic at an ingress Agent.<br>Bit-3: if set to 1, IPv6 Source IP is included as a classifier, shall be set to 0 if the TLV is not for uplink traffic at an ingress Agent.<br>Bit-4: if set to 1, IPv4 Destination IP is included as a classifier, shall be set to 0 if the TLV is not for uplink traffic at an ingress Agent.<br>Bit-5: if set to 1, IPv6 Destination IP is included as a classifier, shall be set to 0 if the TLV is not for uplink traffic at an ingress Agent.<br>Bit-6: if set to 1, Source port is included as a classifier, shall be set to 0 if the TLV is not for uplink traffic at an ingress Agent.<br>Bit-7: if set to 1, Destination port is included as a classifier, shall be set to 0 if the TLV is not for uplink traffic at an ingress Agent.<br>Bit-8: if set to 1, Protocol number is included as a classifier, shall be set to 0 if the TLV is not for uplink traffic at an ingress Agent.<br>Bits 9~15: Reserved. |

FIG. 9A

| Field | Length | Value | Description |
|---|---|---|---|
| | 2 octets | Variable | VLAN VID, present only if Bit-0 of Traffic Classifier Bitmap is set to 1. |
| | 1 octet | Variable | IPv4/v6 DS field, present only if Bit-1 of Traffic Classifier Bitmap is set to 1, the first 5 bits are set to 0. |
| | 4 octets | Variable | IPv4 Source IP address, present only if Bit-2 of Traffic Classifier Bitmap is set to 1. |
| | 16 octets | Variable | IPv6 Source IP address, present only if Bit-3 of Traffic Classifier Bitmap is set to 1. |
| | 4 octets | Variable | IPv4 Destination IP address, present only if Bit-4 of Traffic Classifier Bitmap is set to 1. |
| | 16 octets | Variable | IPv6 Destination IP address, present only if Bit-5 of Traffic Classifier Bitmap is set to 1. |
| | 2 octets | Variable | Source port, present only if Bit-6 of Traffic Classifier Bitmap is set to 1. |
| | 2 octets | Variable | Destination port, present only if Bit-7 of Traffic Classifier Bitmap is set to 1. |
| | 1 octet | Variable | Protocol number, present only if Bit-8 of Traffic Classifier Bitmap is set to 1. |
| | | | Traffic Flow Tagging fields |
| | 1 octet | Variable | Traffic Flow Tagging Bitmap<br>Bit-0: if set 1, VLAN VID is included for tagging the traffic flow.<br>Bit-1: if set to 1, IPv4/v6 DS field is included for tagging the traffic flow.<br>Bits 7~15: Reserved. |

FIG. 9B

| Field | Length | Value | Description |
|---|---|---|---|
| | 1 octet | Variable | 802.1q PCP, present only if Bit-0 of Traffic Flow Tagging Bitmap is set to 1, the first 5 bits are reserved. |
| | 1 octet | Variable | IPv4/v6 DS field, only present if Bit-1 of Traffic Flow Tagging Bitmap is set to 1, the first 2 bits are reserved. |
| | | | Service Priority fields |
| | 1 octet | 0-7 | 802.1D User Priority specified in IEEE802.11 specification. Value 8~15 is reserved. |

FIG. 9C

| Field | Length | Value | Description |
|---|---|---|---|
| tlvType | 1 octet | 0xA1 | AP Capability TLV. |
| tlvLength | 2 octets | 1 | Number of octets in ensuing field. |
| tlvValue | bit 7 | 0: Not supported<br>1: Supported | Support Unassociated STA Link Metrics reporting on the channels its BSSs are currently operating on. |
| | bit 6 | 0: Not supported<br>1: Supported | Support Unassociated STA Link Metrics reporting on channels its BSSs are not currently operating on. |
| | bit 5 | 0: Not supported<br>1: Supported | Support Agent-initiated RCPI-based Steering. |
| | bit 4 | 0: Not supported<br>1: Supported | Support uplink traffic classification for service prioritization at the ingress MAP Agent |
| | bits 3-0 | | Reserved |

FIG. 10

TRAFFIC SERVICE PRIORITIZATION IN A CONTROLLER BASED MULTI-AP NETWORK

CLAIM OF PRIORITY UNDER 35 U.S.C. § 119

The present application for patent claims benefit of U.S. Provisional Patent Application Ser. No. 62/714,434, filed Aug. 3, 2018, which is assigned to the assignee hereof and hereby expressly incorporated by reference herein.

BACKGROUND

Field

The present disclosure relates generally to communication systems, and more particularly, to methods and apparatus for traffic service prioritization in multi AP (MAP) networks.

Description of Related Art

In order to address the issue of increasing bandwidth requirements that are demanded for wireless communication systems, different schemes are being developed to allow multiple user terminals to communicate with a single access point (AP) or multiple APs by sharing the channel resources while achieving high data throughputs. Multiple Input Multiple Output (MIMO) technology represents one such approach that has recently emerged as a popular technique for the next generation communication systems.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Each of the NS independent channels corresponds to a dimension. The MIMO system can provide improved performance (such as higher throughput and greater reliability) if the additional dimensionalities created by the multiple transmit and receive antennas are utilized.

In wireless networks with multiple APs and multiple user stations (STAs), concurrent transmissions may occur on multiple channels toward different STAs, both in uplink and downlink directions. Many challenges are present in such systems. For example, the AP may transmit signals using different standards such as the IEEE 802.11n/a/b/g or the IEEE 802.11ac (Very High Throughput (VHT)) standards. A receiver STA may be able to detect a transmission mode of the signal based on information included in a preamble of the transmission packet.

A downlink multi-user MIMO (MU-MIMO) system based on Spatial Division Multiple Access (SDMA) transmission can simultaneously serve a plurality of spatially separated STAs by applying beamforming at the AP's antenna array. Complex transmit precoding weights can be calculated by the AP based on channel state information (CSI) received from each of the supported STAs.

In a distributed MU-MIMO system, multiple APs may simultaneously serve a plurality of spatially separated STAs by coordinating beamforming by the antennas of the multiple APs. For example, multiple APs may coordinate transmissions to each STA.

As the demand for wireless access continues to increase, there exists a desire for further improvements in wireless technology. Preferably, these improvements should be applicable to other multi-access technologies and the communication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide an apparatus for wireless communication. The apparatus generally includes a processing system configured to generate traffic service prioritization policy information, including service priorities assigned to traffic flows within a multi access point (MAP) network, protocol priority, virtual local area network (VLAN) identifiers (VIDs), and (DS) field values for tagging the traffic flows and at least one interface configured to output the traffic service prioritization policy information to agents in the MAP network for use in prioritizing traffic in the MAP network.

Certain aspects provide an apparatus for wireless communication. The apparatus generally includes at least one interface configured to obtain traffic service prioritization policy information including service priorities assigned to traffic flows within a multi access point (MAP) network, protocol priority, virtual local area network (VLAN) identifiers (VIDs), and (DS) field values for tagging the traffic flows and a processing system configured to prioritize traffic in the MAP network based on the service priorities and protocol priority, VLAN VID and DS field values assigned to the traffic flows.

Certain aspects provide an apparatus for wireless communication. The apparatus generally includes at least one interface configured to obtain traffic service prioritization policy information including service priorities assigned to traffic flows within a multi access point (MAP) network, protocol priority, virtual local area network (VLAN) identifiers (VIDs), and (DS) field values for tagging the traffic flows and a processing system configured to prioritize traffic in the MAP network based on the service priorities and DS field values assigned to the traffic flows.

Aspects generally include methods, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 9A-9C illustrate an example Traffic Service Prioritization Policy type length value (TLV) format FIG. 10 illustrates an example AP Capability type length value (TLV) format.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
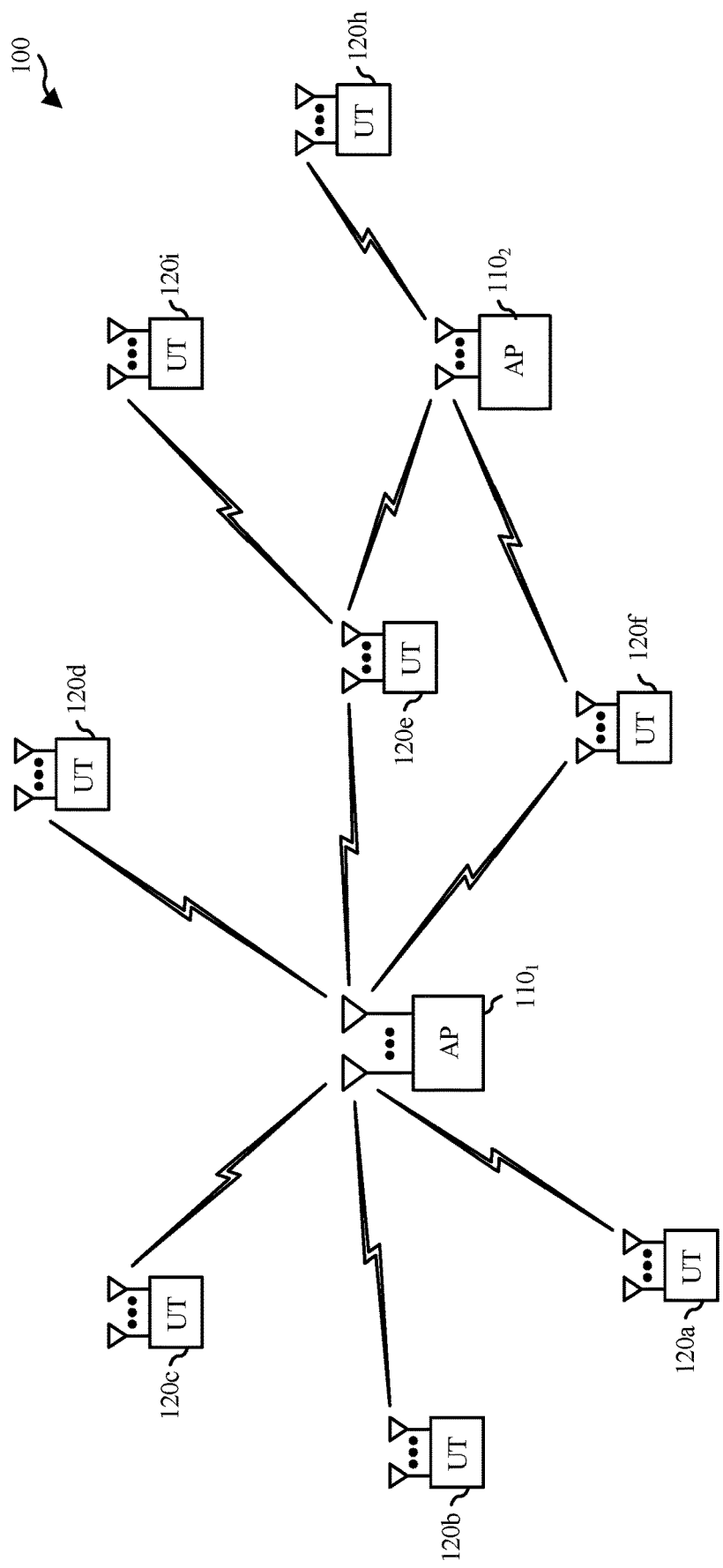
FIG. 1 is a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

The techniques described herein may be used for various broadband wireless communication systems, including communication systems that are based on a single carrier transmission. Aspects may be, for example, advantageous to systems employing Ultra-Wide Band (UWB) signals including millimeter-wave signals. However, this disclosure is not intended to be limited to such systems, as other coded signals may benefit from similar advantages.

The techniques may be incorporated into (such as implemented within or performed by) a variety of wired or wireless apparatuses (such as nodes). In some implementations, a node includes a wireless node. Such a wireless node may provide, for example, connectivity to or for a network (such as a wide area network (WAN) such as the Internet or a cellular network) via a wired or wireless communication link. In some implementations, a wireless node may include an access point or a user terminal.

Multiple APs may transmit to multiple receiving user terminals at a time by using distributed multi-user multiple input multiple output (MU-MIMO). For example, multiple APs may transmit data to a given user terminal at a time, meaning the transmission of data to the user terminal is distributed between the multiple APs. The multiple APs may utilize beamforming to steer signals spatially to the user terminal. In some implementations, for the multiple APs to perform distributed MU-MIMO, the multiple APs coordinate the beamforming performed by each AP to reduce interference for transmitting data to the user terminal. In some implementations, the multiple APs perform a procedure to form a group of APs to transmit to the user terminal, as discussed herein. Further, in some implementations, to coordinate the beamforming between the multiple APs, the multiple APs perform a sounding procedure to gather feedback information from the user terminal about wireless channels between the multiple APs and the user terminal, as discussed herein. The multiple APs may utilize the feedback information to perform beamforming.

Particular implementations of the subject matter described in this disclosure can be implemented to realize one or more of the following potential advantages. For example, APs are able to form a group for transmitting to a user terminal using over the air signaling as opposed to communicating over a backhaul. This may reduce data congestion on the backhaul. Additionally, the sounding procedures may allow for coordinated gathering of feedback information by multiple APs from user terminals. Accordingly, the feedback information for the multiple APs may include channel conditions for each of the multiple APs coordinated in time, which may improve the accuracy of the beamforming based on the feedback information. Furthermore, the sounding procedures may limit the amount of data exchanged wirelessly to perform the sounding procedures, which may reduce bandwidth usage of wireless channels.

Example Wireless Communication System

FIG. 1 illustrates a multiple-access point (multi-AP or MAP) network 100 with access points 110 and user terminals 120. For simplicity, only two access points 110 (e.g., APs $110_1$ and $110_2$) are shown in FIG. 1. APs $110_1$ and $110_2$ may coordinate to route traffic between each other and to serve multiple UTs 120, in accordance with techniques described herein.

An access point (AP) is generally a fixed station that communicates with the user terminals and also may be referred to as a base station or some other terminology. A user terminal may be fixed or mobile and also may be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

The access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal also may communicate peer-to-peer with another user terminal.

The MAP network 100 employs multiple transmit and multiple receive antennas for data transmission on the downlink and uplink. The access point 110 is equipped with a number Nap of antennas and represents the multiple-input (MI) for downlink transmissions and the multiple-output (MO) for uplink transmissions. A set Nu of selected user terminals 120 collectively represents the multiple-output for downlink transmissions and the multiple-input for uplink transmissions. In some implementations, it may be desirable to have Nap≥Nu≥1 if the data symbol streams for the Nu user terminals are not multiplexed in code, frequency or time by some means. Nu may be greater than Nap if the data symbol streams can be multiplexed using different code channels with CDMA, disjoint sets of sub-bands with OFDM, and so on. Each selected user terminal transmits user-specific data to and receives user-specific data from the access point. In general, each selected user terminal may be equipped with one or multiple antennas (i.e., Nut≥1). The Nu selected user terminals can have the same or different number of antennas.

The MAP network 100 may be a time division duplex (TDD) system or a frequency division duplex (FDD) system. For a TDD system, the downlink and uplink share the same frequency band. For an FDD system, the downlink and uplink use different frequency bands. The MAP network 100 also may utilize a single carrier or multiple carriers for transmission. Each user terminal may be equipped with a single antenna (such as in order to keep costs down) or multiple antennas (such as where the additional cost can be supported). The MAP network 100 may represent a high speed Wireless Local Area Network (WLAN) operating in a 60 GHz band.

Figure 2:
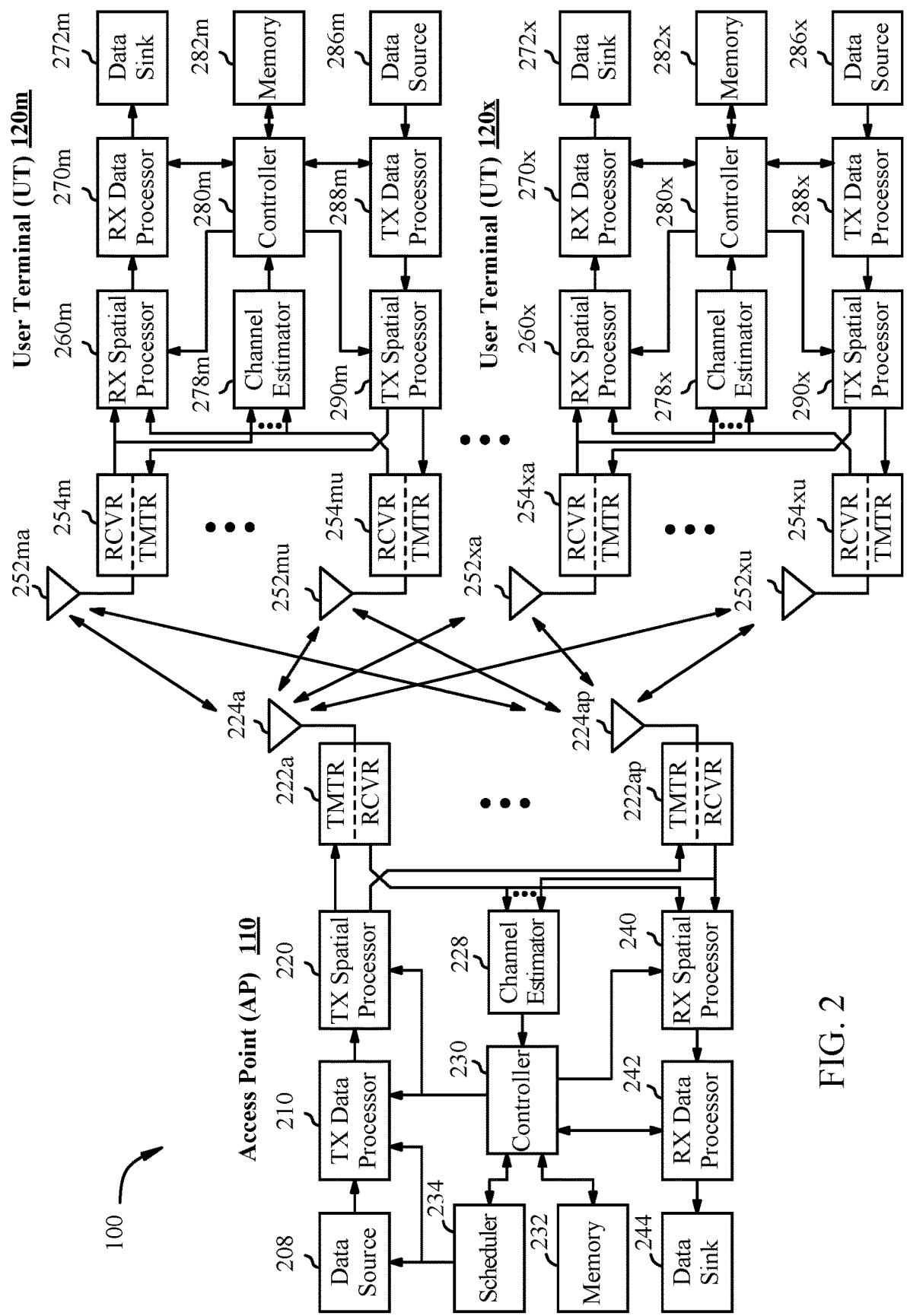
FIG. 2 is a block diagram of an example access point and example stations, in accordance with certain aspects of the present disclosure.

FIG. 2 illustrates example components of the access point 110 and station 120 illustrated in FIG. 1, which may be used to implement aspects of the present disclosure. One or more components of the access point 110 and station 120 may be used to practice aspects of the present disclosure. For example, antenna 224, transmitter/receiver unit 222, processors 210, 220, 240, 242, and/or controller 230 or antenna 252, transmitter/receiver 254, processors 260, 270, 288, and 290, and/or controller 280 may be used to perform the operations described herein and illustrated with reference to FIGS. 7, 7A, 8, 8A, 15, and 15A.

FIG. 2 shows a block diagram of the access point/base station 110 and two user terminals/user equipments 120m and 120x in a MAP network 100. The access point 110 is equipped with Nap antennas 224a through 224ap. The user terminal 120m is equipped with Nut,m antennas 252ma through 252mu, and the user terminal 120x is equipped with Nut,x antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, Nup user terminals are selected for simultaneous transmission on the uplink, and Ndn user terminals are selected for simultaneous transmission on the downlink. Moreover, Nup may or may not be equal to Ndn, and Nup, and Ndn may include static values or can change for each scheduling interval. Beamforming (such as beamsteering) or some other spatial processing techniques may be used at the access point and user terminal.

On the uplink, at each user terminal 120 selected for uplink transmission, a TX data processor 288 receive traffic data from a data source 286 and control data from a controller 280. The controller 280 may be coupled with a memory 282. The TX data processor 288 processes (such as encodes, interleaves, and modulates) the traffic data {dup, m} for the user terminal based on the coding and modulation schemes associated with the rate selected for the user terminal and provides a data symbol stream {sup,m}. A TX spatial processor 290 performs spatial processing on the data symbol stream {sup,m} and provides Nut,m transmit symbol streams for the Nut,m antennas. Each transmitter unit (TMTR) 254 receives and processes (such as converts to analog, amplifies, filters, and frequency upconverts) a respective transmit symbol stream to generate an uplink signal. The Nut,m transmitter units 254 provide Nut,m uplink signals for transmission from the Nut,m antennas 252 to the access point 110.

A number Nup of user terminals may be scheduled for simultaneous transmission on the uplink. Each of these user terminals performs spatial processing on its data symbol stream and transmits its set of transmit symbol streams on the uplink to the access point.

At the access point 110, the Nap antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by the transmitter unit 254 and provides a received symbol stream. An RX spatial processor 240 performs receiver spatial processing on the Nap received symbol streams from the Nap receiver units 222 and provides Nup recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream {sup,m} is an estimate of a data symbol stream {sup,m} transmitted by a respective user terminal. An RX data processor 242 processes (such as demodulates, de-interleaves, and decodes) each recovered uplink data symbol stream {sup,m} in accordance with the rate used for that stream to obtain decoded data. The decoded data for each user terminal may be provided to a data sink 244 for storage and a controller 230 for further processing.

On the downlink, at the access point 110, a TX data processor 210 receives traffic data from a data source 208 for Ndn user terminals scheduled for downlink transmission, control data from a controller 230, and possibly other data from a scheduler 234. The various types of data may be sent on different transport channels. The TX data processor 210 processes (such as encodes, interleaves, and modulates) the traffic data for each user terminal based on the rate selected for that user terminal. The TX data processor 210 provides Ndn downlink data symbol streams for the Ndn user terminals. A TX spatial processor 220 performs spatial processing on the Ndn downlink data symbol streams, and provides Nap transmit symbol streams for the Nap antennas. Each transmitter unit (TMTR) 222 receives and processes a respective transmit symbol stream to generate a downlink signal. The Nap transmitter units 222 provide Nap downlink signals for transmission from the Nap antennas 224 to the user terminals. The decoded data for each STA may be provided to a data sink 272 for storage and/or a controller 280 for further processing.

At each user terminal 120, the Nut,m antennas 252 receive the Nap downlink signals from the access point 110. Each receiver unit (RCVR) 254 processes a received signal from an associated antenna 252 and provides a received symbol stream. An RX spatial processor 260 performs receiver spatial processing on Nut,m received symbol streams from the Nut,m receiver units 254 and provides a recovered downlink data symbol stream {sdn,m} for the user terminal. The receiver spatial processing can be performed in accordance with the CCMI, MMSE, or other known techniques. An RX data processor 270 processes (such as demodulates, de-interleaves, and decodes) the recovered downlink data symbol stream to obtain decoded data for the user terminal.

At each user terminal 120, the Nut,m antennas 252 receive the Nap downlink signals from the access point 110. Each receiver unit (RCVR) 254 processes a received signal from an associated antenna 252 and provides a received symbol stream. An RX spatial processor 260 performs receiver spatial processing on Nut,m received symbol streams from the Nut,m receiver units 254 and provides a recovered downlink data symbol stream {sdn,m} for the user terminal. The receiver spatial processing is performed in accordance with the CCMI, MMSE, or some other technique. An RX data processor 270 processes (such as demodulates, de-interleaves, and decodes) the recovered downlink data symbol stream to obtain decoded data for the user terminal.

Figure 3:
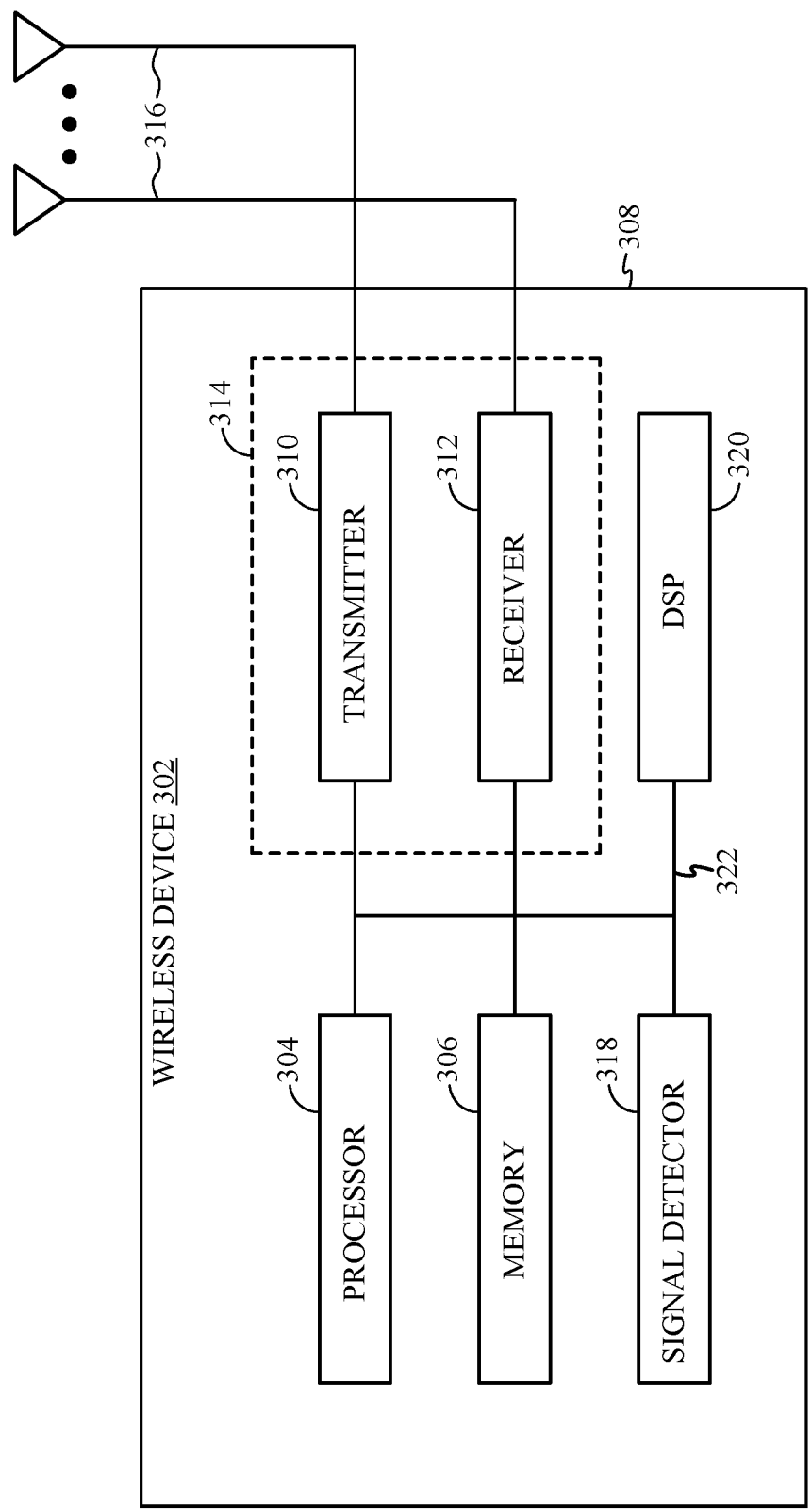
FIG. 3 illustrates an example wireless device, in accordance with certain aspects of the present disclosure.

FIG. 3 illustrates various components that may be utilized in a wireless device 302 that may be employed within the MAP network 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 also may be referred to as a central processing unit (CPU). Memory 306, which may include both read-only memory (ROM) and random access memory (RAM), provides instructions and data to the processor 304. A portion of the memory 306 also may include non-volatile random access memory (NVRAM). The processor 304 typically performs logical and arithmetic operations based on program instructions stored within the memory 306. The instructions in the memory 306 may be executable to implement the methods described herein.

The wireless device 302 also may include a housing 308 that may include a transmitter 310 and a receiver 312 to allow transmission and reception of data between the wireless device 302 and a remote location. The transmitter 310 and the receiver 312 may be combined into a transceiver 314. A plurality of transmit antennas 316 may be attached to the housing 308 and electrically coupled to the transceiver 314. The wireless device 302 also may include (not shown) multiple transmitters, multiple receivers, and multiple transceivers.

The wireless device 302 also may include a signal detector 318 that may be used in an effort to detect and quantify the level of signals received by the transceiver 314. The signal detector 318 may detect such signals as total energy, energy per subcarrier per symbol, power spectral density and other signals. The wireless device 302 also may include a digital signal processor (DSP) 320 for use in processing signals.

The various components of the wireless device 302 may be coupled together by a bus system 322, which may include a power bus, a control signal bus, and a status signal bus in addition to a data bus.

Example Traffic Service Prioritization in Map Networks

Aspects of the present disclosure provide techniques that may help achieve service prioritization of traffic in multi AP (MAP) networks. MAP networks may be based on certain aspects of existing standards, for example, on to the IEEE 802.1q standard. Sometimes referred to as "Dot1q," the 802.1q standard is a networking standard that supports virtual LANs (VLANs) on an Ethernet network.

Figure 4:
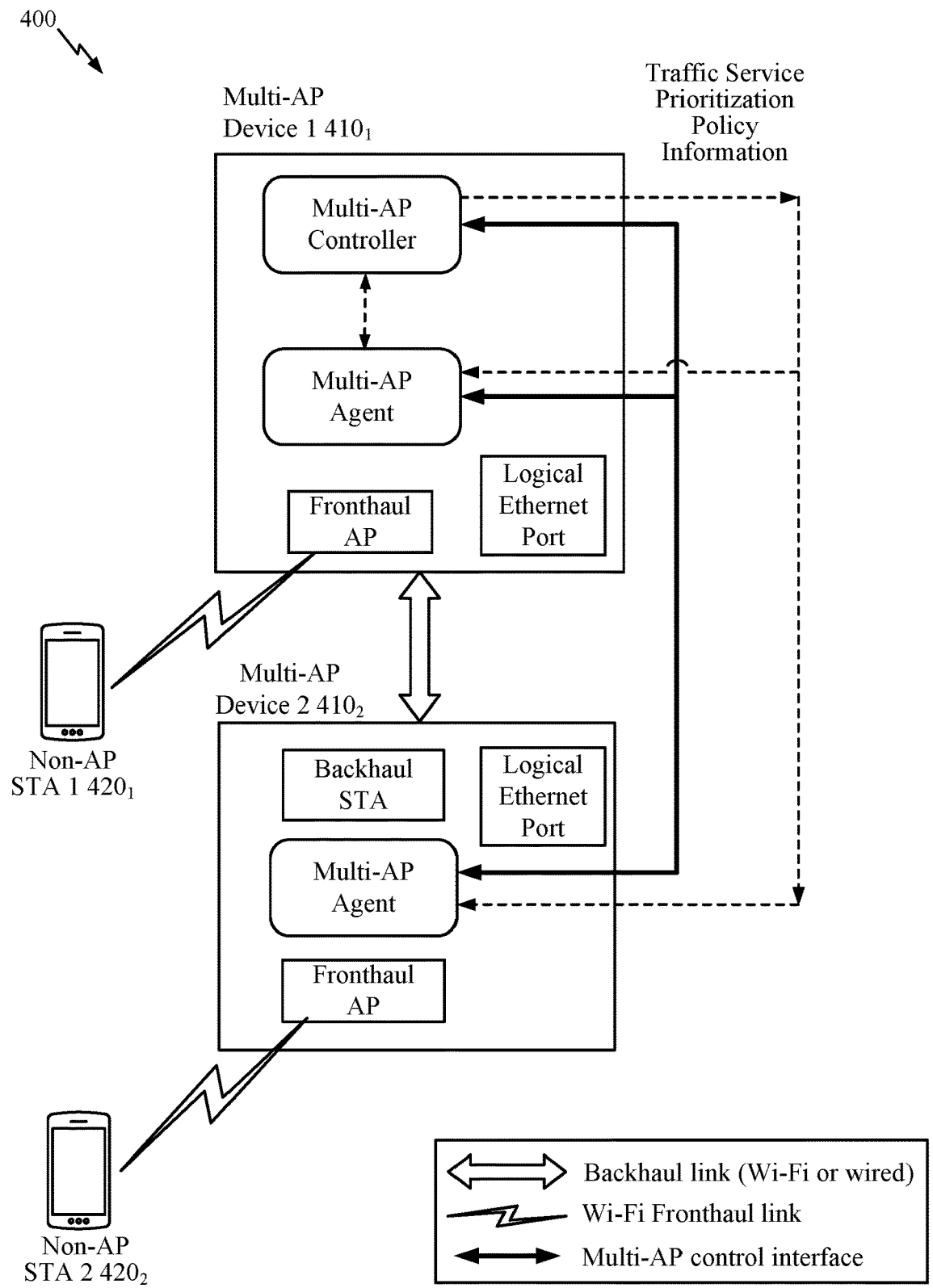
FIG. 4 illustrates a first example diagram of a multi access point (MAP) network, in accordance with certain aspects of the present disclosure.

FIG. 4 illustrates an example MAP network 400 in which MAP devices $410_1$ and $410_2$ route traffic to and from non-AP STAs $420_1$ and $420_2$. In this example, MAP devices $410_1$ and $410_2$ communicate directly with non AP STAs $420_1$ and $420_2$ via a wireless fronthaul link, while MAP devices $410_1$ and $410_2$ communicate with each other via a backhaul link that may be wired or wireless.

As illustrated in FIG. 4, the MAP network 400 may be central controller based, for example, with a MAP controller residing on a device within the MAP network (e.g., within a gateway device and/or co-located with a MAP agent). In this example, the MAP controller resides on a MAP device $410_1$. The controller may configure (via a MAP control interface) other devices, referred to as agents, to perform traffic routing as described herein. For example, the controller may generate and send traffic service prioritization policy information to MAP network agents residing on MAP devices $410_1$ and $410_2$, for use in processing traffic, in accordance with aspects of the present disclosure.

Figure 5:
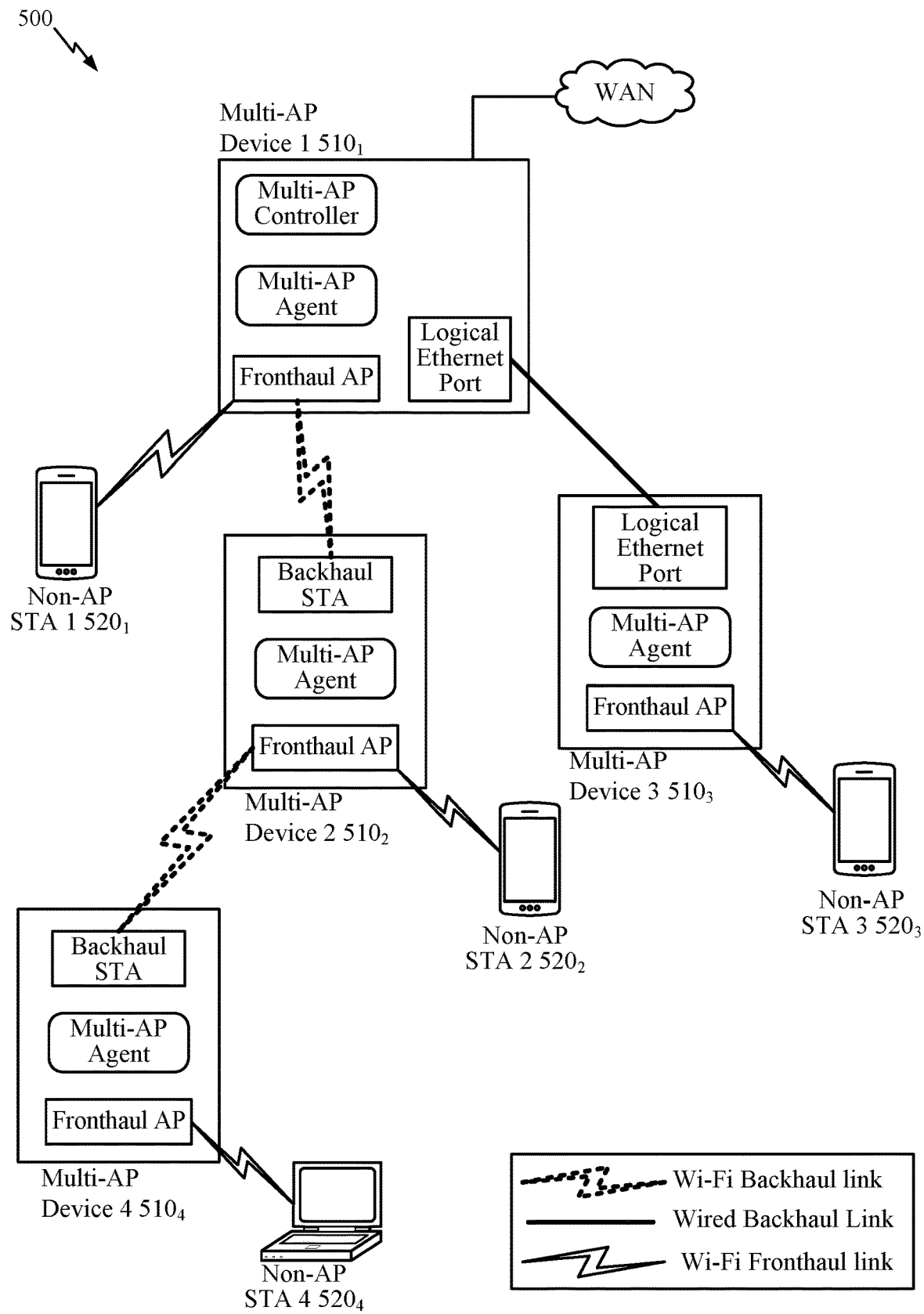
FIG. 5 illustrates a second example diagram of a multi access point (MAP) network, in accordance with certain aspects of the present disclosure.

FIG. 5 illustrates another example MAP network 500 in which MAP devices $510_1$, $510_2$, $510_3$, and $510_4$ route traffic to and from non-AP STAs $520_1$, $520_2$, $520_3$ and $520_4$. In this example, MAP devices $510_{1-4}$ communicate directly with non AP STAs $520_{1-4}$ via a wireless fronthaul link. In this case, MAP devices $510_1$ and $510_2$ communicate with each other via a wireless backhaul link (as do MAP devices $510_2$ and $510_4$), while MAP devices $510_1$ and $510_3$ communicate via a wired backhaul link. As illustrated in FIG. 5, the MAP controller may reside on MAP device $510_1$ which, in this case, may be connected to a wide area network (WAN) and may serve as a gateway device.

Figure 6:
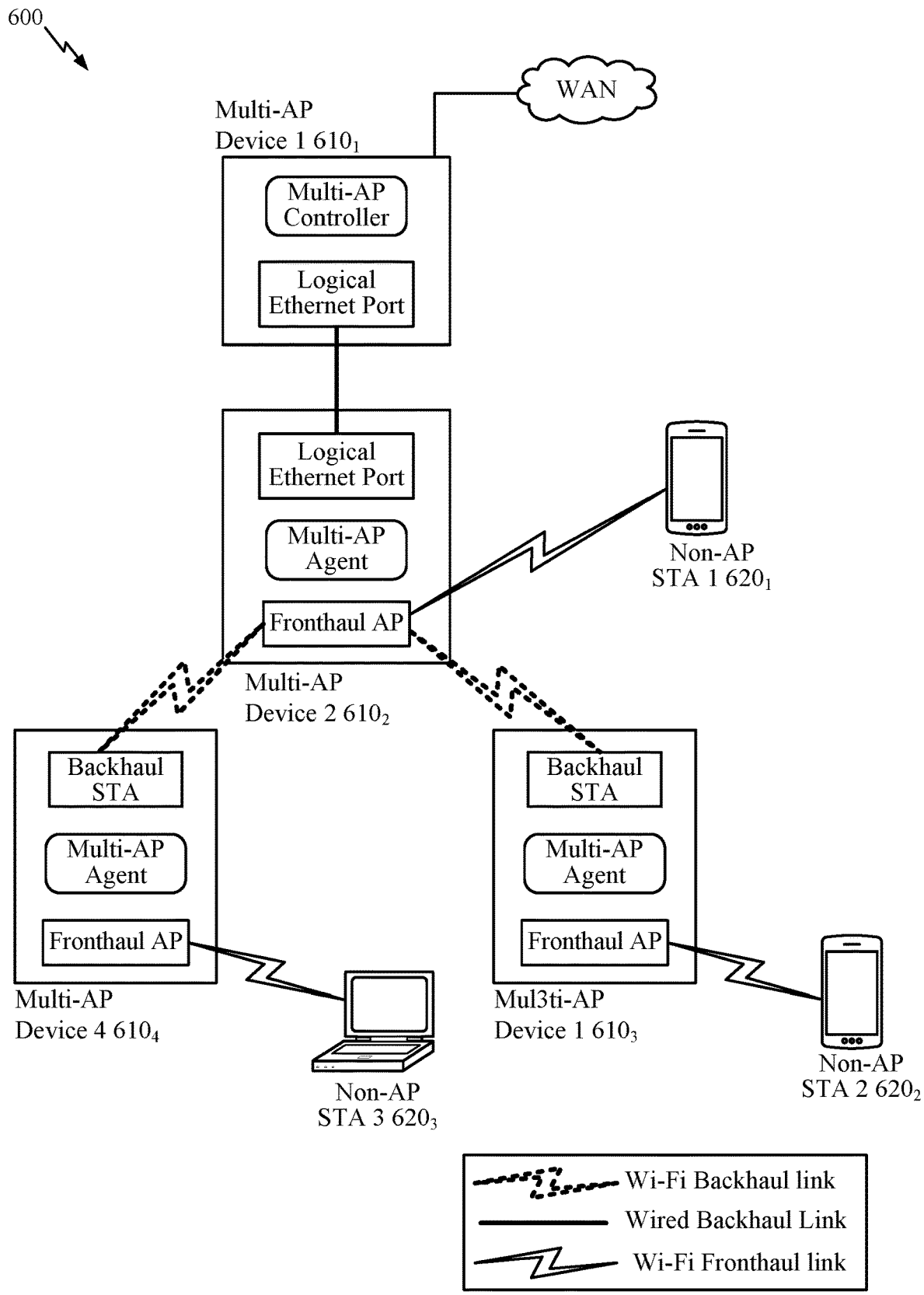
FIG. 6 illustrates a third example diagram of a multi access point (MAP) network, in accordance with certain aspects of the present disclosure.

FIG. 6 illustrates yet another example MAP network 600 in which MAP devices $610_2$, $610_3$, and $610_4$ route traffic to and from non-AP STAs $620_1$, $620_2$, and $620_3$. In this example, the MAP controller resides on a separate Multi-AP device $610_1$ which, in this case, may be connected to a WAN and may serve as a gateway device. In this example, MAP devices $610_{2-4}$ communicate directly with non AP STAs $620_{1-3}$ via a wireless fronthaul link. In this case, MAP device $610_2$ communicates with MAP devices $610_{3-4}$ via a wireless backhaul link, while MAP device $610_2$ communicates with MAP device $610_1$ via a wired backhaul link. In this arrangement, MAP device $610_2$ may obtain control information from MAP device $610_1$ and forward the control information to MAP devices $610_{3-4}$.

As illustrated in the various examples shown in FIGS. 4, 5 and 6, through various wired and/or wireless fronthaul and backhaul connections via various MAP agents, the MAP network may serve to route traffic to and from various non-AP STAs. For example, the MAP agents may be configured to process uplink and/or downlink traffic in accordance with the traffic service prioritization policy information received from the controller. In some cases, the actual topology for a MAP network may depend on capabilities of the agents in the MAP network. For example, a MAP controller may arrange the topology in such a way that traffic for all VIDs downstream of an Agent can be forwarded by that Agent.

Aspects of the present disclosure provide service prioritization support for traffic in Multi-AP (MAP) Networks. As described herein, traffic flows may be mapped to a specific service priority. The traffic flows may be classified or unclassified. In this context, classified generally refers to a traffic flow that has been categorized into a distinct class (e.g., according to Traffic Category or Traffic Stream classification).

Figure 7:
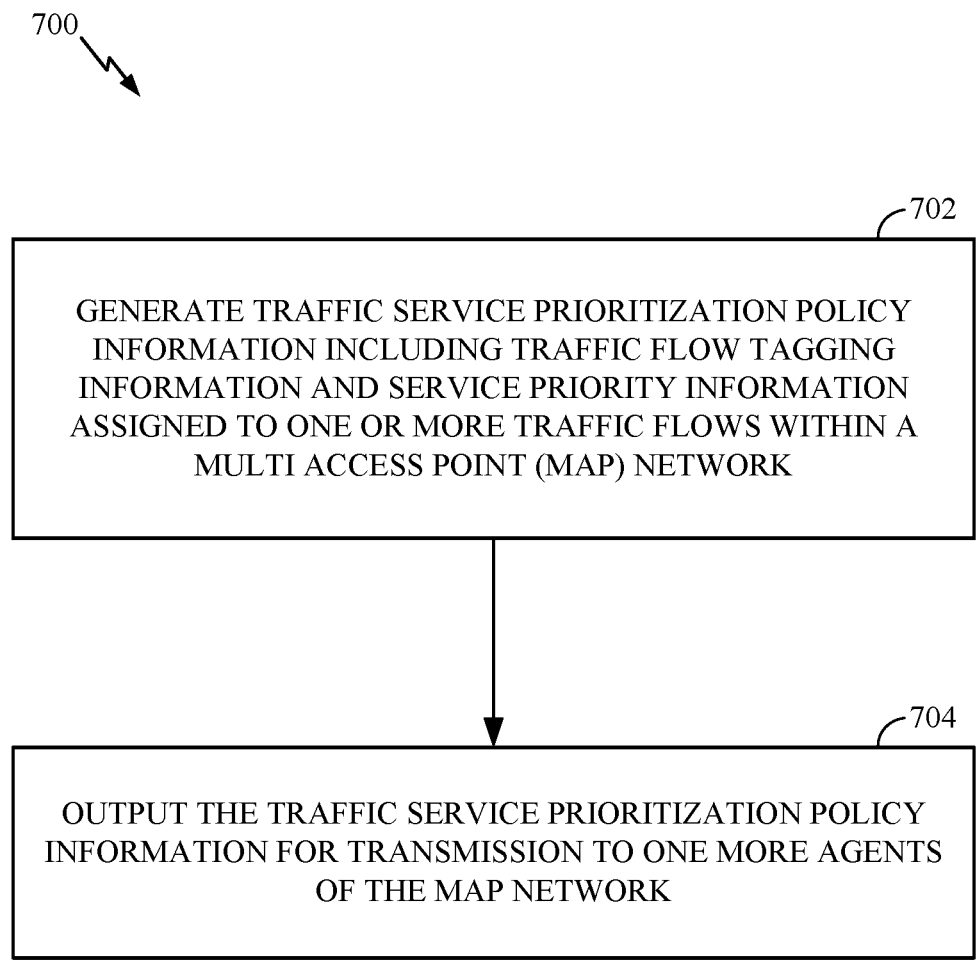
FIG. 7 is a flow diagram of example operations for wireless communication, in accordance with certain aspects of the present disclosure.
Figure 7A:
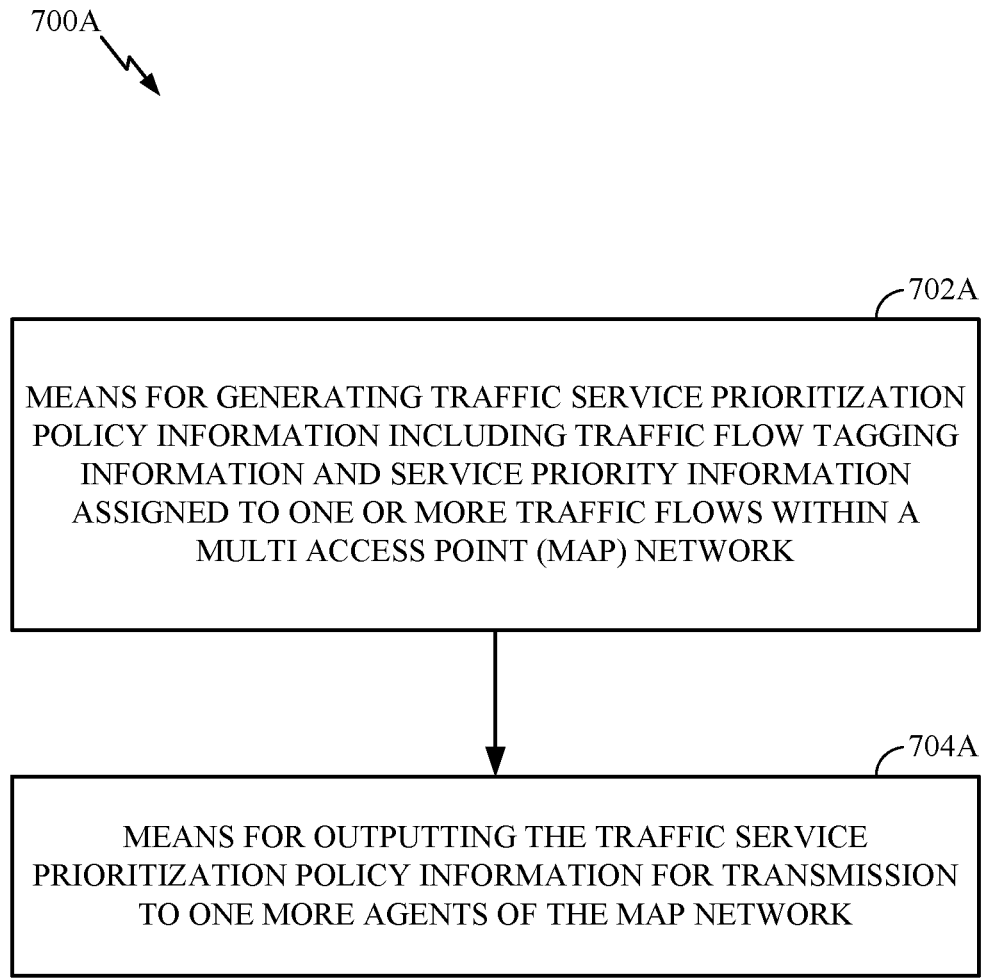
FIG. 7A illustrates example components capable of performing the operations shown in FIG. 7, in accordance with certain aspects of the present disclosure.

FIG. 7 illustrates example operations 700 for wireless communications by an apparatus, in accordance with aspects of the present disclosure. For example, operations 700 may be performed by a controller (any device acting as a controller function) of a MAP network, such as any of the MAP devices ($410_1$, $510_1$ or $610_1$) shown in FIGS. 4-6 with a resident controller shown in FIGS. 4-6.

Operations 700 begin, at 702, by generating traffic service prioritization policy information, including traffic flow tagging information and service priority information assigned to one or more traffic flows within a multi access point (MAP) network. The service prioritization information may assign service priorities to traffic flows within the MAP network. The tagging information may include at least one of a protocol priority (e.g., a priority code point or PCP field value), virtual local area network (VLAN) identifiers (VIDs), or (DS) field values for tagging the traffic flows.

Figure 8:
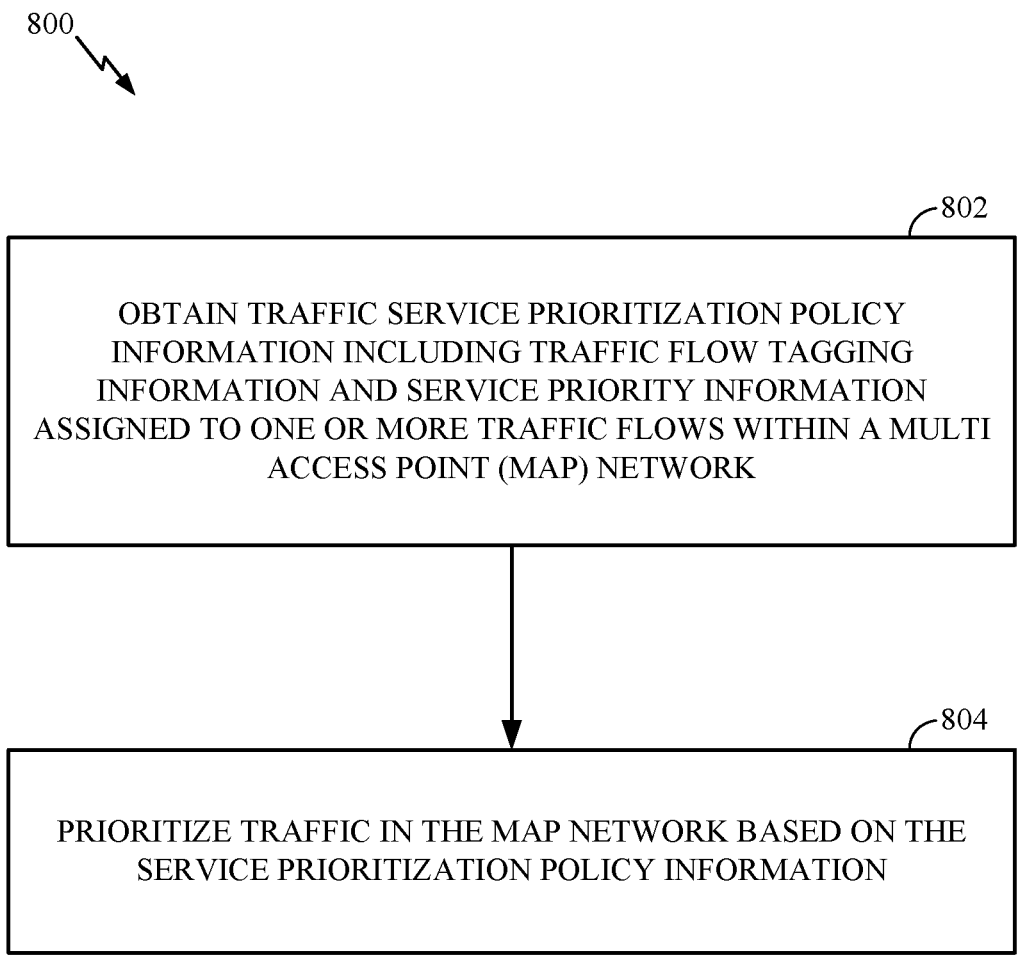
FIG. 8 is a flow diagram of example operations for wireless communication, in accordance with certain aspects of the present disclosure.
Figure 8A:
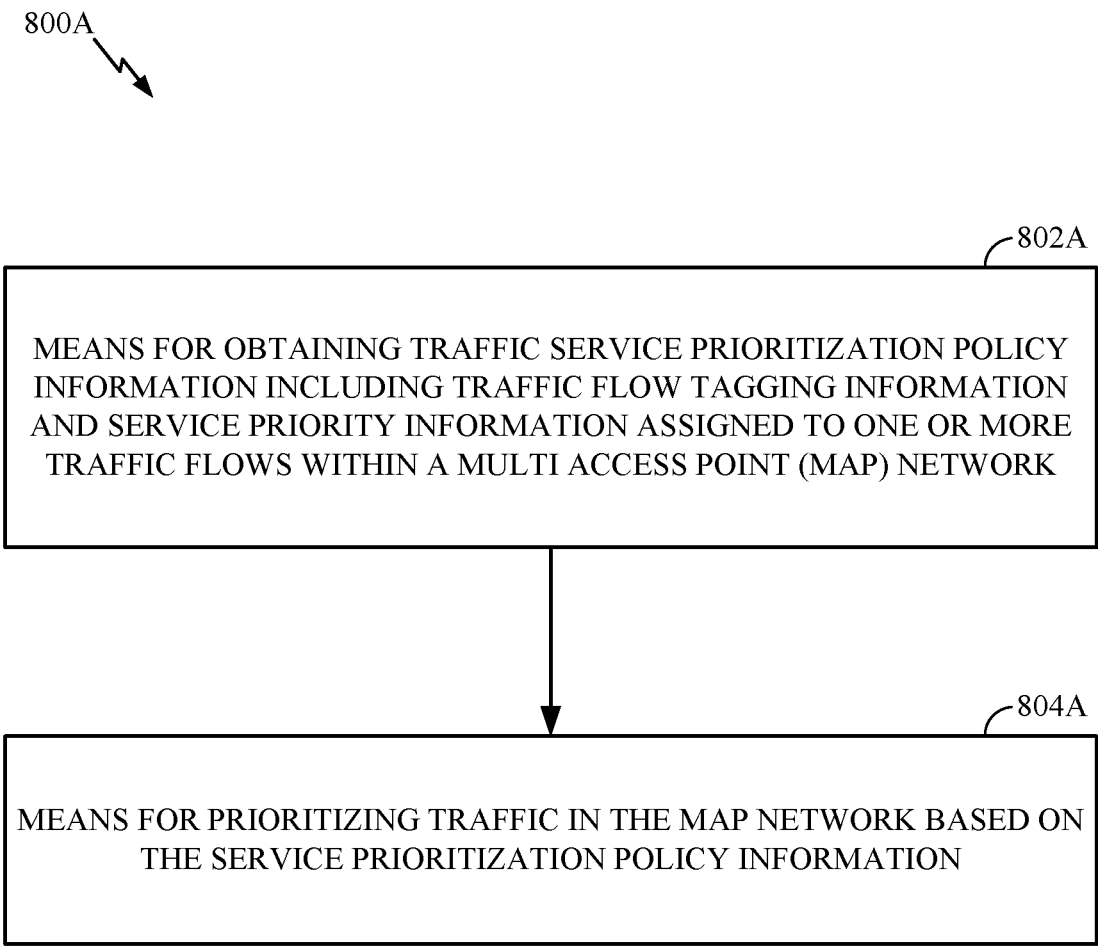
FIG. 8A illustrates example components capable of performing the operations shown in FIG. 8, in accordance with certain aspects of the present disclosure.

At 704, the apparatus outputs the traffic service prioritization policy information to one or more agents of the MAP network. For example, the traffic service prioritization policy information may be output for transmission via a type length value (TLV) field. The TLV field may be included in a message, such as a MAP policy configuration request message or a Wi-Fi simple configuration (WSC) message FIG. 8 is a flow diagram of example operations 800 for wireless communication by an apparatus, in accordance with certain aspects of the present disclosure. Operations 800 may be performed, for example, by a MAP agent (such as any of the MAP devices shown in FIGS. 4-6 with a resident MAP agent) or gateway device receiving traffic service prioritization information from a MAP controller.

The operations 800 begin, at 802, by obtaining traffic service prioritization policy information including traffic flow tagging information and service priority information assigned to one or more traffic flows within a multi access point (MAP) network. At 804, the apparatus prioritizes traffic in the MAP network based on the service prioritization policy information.

As described above, aspects of the present disclosure provide support for service prioritization support for traffic in a MAP network by having a controller generate and distribute service prioritization policy information to other devices (MAP agents/gateways) in the MAP network. The service prioritization policy information may include information for tagging traffic flows as well as service priority information that maps specific traffic flows to specific service priorities. Any suitable mechanism may be used for identifying the traffic classifier for a specific purpose.

In some cases, traffic belonging to a traffic flow may be tagged with a IPv4/v6 Differentiated Service (DS) field value, and/or tagged with a unique VLAN VID. As noted above, the assignment of the IPv4/v6 Differentiated Service (DS) field value or VLAN VID to a traffic flow may be determined by the Controller and conveyed in the service prioritization policy information.

As illustrated in FIG. 4, the controller may send traffic service prioritization information, including traffic flow tagging info for a classified traffic flow, to Agents and the Gateway. The Agents and the Gateway subsequently apply the traffic tagging as instructed. For example, the agents and gateway may tag traffic flows (e.g., adding a VID and/or DS field value) as indicated by the traffic tagging information. The VLAN VID may be used to tag the traffic of a traffic flow. The VLAN VID may belong to VLAN VID blocks of the SSID that carries the traffic.

In some cases, if the identifier fields (e.g., VLAN ID, source/destination MAC ID, and/or DS field value) indicated in the traffic service prioritization information match that of an incoming packet, an agent may update a prioritization field (e.g., a PCP field) for that field according to the traffic service prioritization information.

A classified traffic flow tagged with an IPv4/v6 Differentiated Service (DS) field value, or tagged with a unique VLAN VID is assigned with a service priority. For example, the service priority has a value between 0 and 7. In some cases, the service priority value may have the same meaning of the user priority defined in 802.1D user priority (UP)-to-access category (AC)-Mapping in IEEE 802.11 specification. The quality of service (QoS) treatment to traffic flow of a specific service priority in a WLAN BSS may be determined by the UP-AC mapping in IEEE802.11 specification. As with the traffic flow tagging information, the assignment of the service priority to a classified traffic flow may be determined by the Controller.

In some cases, unclassified traffic flow (e.g., a traffic flow that has not been categorized into a distinct class) tagged with an IPv4/v6 Differentiated Service (DS) field value may also be assigned a service priority. The assignment of the service priority to unclassified traffic flow tagged by a specific IPv4/v6 Differentiated Service (DS) field value may also be determined by the Controller.

Based on Traffic Service Prioritization Configuration at the Controller, the Controller may send the Traffic Service Prioritization Policy of traffic flows to the Agents, using Traffic Flow Service Prioritization Policy type length value (TLV), such as the TLV format shown in FIGS. 9A-9C. In some cases, the TLV containing the traffic service prioritization policy information may be enclosed in a Multi-AP Policy Configuration Request message.

As illustrated in the portion of the example TLV format shown in FIG. 9A, in some cases, the TLV may include a bitmap that indicates which fields are included in the TLV as a classifier. As illustrated in the portion shown in FIG. 9B, the TLV may also include a traffic flow tagging bitmap that indicates which field is included for tagging the traffic flow (e.g., a VID and/or a DS field). As illustrated in the portion shown in FIG. 9C, and as noted above, the service priority value may have the same meaning of the user priority defined in 802.1D user priority.

In effect, the traffic flow classifier bitmap and/or the traffic flow tagging bitmap may form a rule an agent (or gateway) may apply to determine how to prioritize a certain traffic flow. For example, if the agent (or gateway) determines the values provided in these fields (indicated as included as a classifier) match those of an incoming packet, the agent (or gateway) may update the priority for that packet (and or tag the traffic flow) as indicated in the TLV.

Traffic Classifiers for downlink traffic at the Gateway may be based on IPv4/v6 Differentiated Service (DS) field or IP 5-tuple, Differentiated Services Code Point (DSCP), or media access control (MAC) ID. A 5-tuple generally refers to a set of five different values that define a transport layer flow: a source IP address, a destination IP address, a source port number, a destination port number, and the protocol in use (Source IP, Destination IP, Source Port, Destination Port, Protocols).

Traffic Classifiers for downlink traffic at Agents and for uplink traffic flows at non-ingress Agents may be based on 802.1q PCP field or IPv4/v6 Differentiated Service (DS) field values.

Traffic Classifiers for uplink traffic at ingress Agents may be based on IPv4/v6 Differentiated Service (DS) field or IP 5-tuple (Source IP, Destination IP, Source Port, Destination Port, Protocols). In such cases, if an ingress agent detects a match in the DS field and/or IP 5-tuple fields, the ingress agent may assign a corresponding priority value conveyed in the traffic service prioritization policy information. The support for Traffic Classifiers for uplink traffic at ingress Agents may be optional.

In some cases, a MAP Agent may signal its support for uplink traffic classification for service prioritization. For example, a MAP agent may signal this support via an uplink traffic classification for service prioritization bit in an AP Capability TLV, as shown in FIG. 10, which may be sent in an AP Capability Report message. In some cases, the Controller may only send Traffic Classifiers for uplink traffic to ingress Agents if the uplink traffic classification for service prioritization bit is set to 1 in the AP Capability TLV in the AP Capability Report message.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 700 and 800 illustrated in FIGS. 7 and 8 correspond to means 700A and 800A illustrated in FIGS. 7A and 8A, respectively.

For example, means for transmitting (or means for outputting for transmission) may comprise a transmitter (e.g., the transmitter unit 222) and/or an antenna(s) 224 of the access point 110 or the transmitter unit 254 and/or antenna(s) 252 of the station 120 illustrated in FIG. 2. Means for receiving (or means for obtaining) may comprise a receiver (e.g., the receiver unit 222) and/or an antenna(s) 224 of the access point 110 or the receiver unit 254 and/or antenna(s) 252 of the station 120 illustrated in FIG. 2. Means for processing, means for extracting, means for performing channel estimation, means for demultiplexing, means for obtaining, means for generating, means for selecting, means for decoding, means for deciding, means for demultiplexing, means for discarding, or means for determining, may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the station 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a processing system configured to generate traffic service prioritization policy information including traffic flow tagging information and service priority information assigned to one or more traffic flows within a multi access point (MAP) network, wherein the traffic flow tagging information assigned to the one or more traffic flows comprises at least differentiated service (DS) field values, and wherein the traffic service prioritization policy information assigns a service priority value to at least one unclassified traffic flow tagged with a specific DS field value; and
   at least one interface configured to:
      obtain capability information from one or more agents of the MAP network; and
      output the traffic service prioritization policy information for transmission to a MAP agent of the one or more agents of the MAP network in response to the capability information of the MAP agent indicating support, via a service prioritization bit in a message, for traffic classification into a distinct class for service prioritization.

2. The apparatus of claim 1, wherein the service priority information assigned to each traffic flow comprises a priority defined according to the 802.1q standard.

3. The apparatus of claim 1, wherein the traffic flow tagging information assigned to the one or more traffic flows further comprises virtual local area network identifiers (VIDs).

4. The apparatus of claim 3, wherein the VIDs are based on at least one of media access control (MAC) identifiers, internet protocol (IP) identifiers, Differentiated Services Code Point (DSCP) identifiers, or Transport Protocol identifiers.

5. The apparatus of claim 1, wherein the traffic service prioritization policy information is output for transmission via a type length value (TLV).

6. An apparatus for wireless communications, comprising:
   at least one interface configured to:
      output, via a service prioritization bit for transmission in a message, capability information indicating that the apparatus supports traffic classification into a distinct class for service prioritization; and
      in response to the capability information being output, obtain traffic service prioritization policy information including traffic flow tagging information and service priority information assigned to one or more traffic flows within a multi access point (MAP) network, wherein the traffic flow tagging information assigned to the one or more traffic flows comprises at least differentiated service (DS) field values, and wherein the traffic service prioritization policy information assigns a service priority value to at least one unclassified traffic flow tagged with a specific DS field value; and
   a processing system configured to prioritize traffic in the MAP network based on the traffic service prioritization policy information.

7. The apparatus of claim 6, wherein the service priority information assigned to each traffic flow comprises a priority defined according to the 802.1q standard.

8. The apparatus of claim 6, wherein the traffic flow tagging information assigned to the one or more traffic flows further comprises virtual local area network identifiers (VIDs).

9. The apparatus of claim 8, wherein the VIDs are based on at least one of media access control (MAC) identifiers, internet protocol (IP) identifiers, Differentiated Services Code Point (DSCP) identifiers, or Transport Protocol identifiers.

10. The apparatus of claim 6, wherein the traffic service prioritization policy information is output for transmission via a type length value (TLV).

11. The apparatus of claim 10, wherein the processing system is further configured to determine which type of field values are assigned for tagging a certain traffic flow based on one or more bits in the TLV.

12. The apparatus of claim 10, wherein the processing system is further configured to determine which type of field values are used as a classifier for a certain traffic flow based on one or more bits in the TLV.

13. The apparatus of claim 6, wherein the apparatus is configured to operate as a gateway.

14. A method for wireless communications by an apparatus, comprising:
generating traffic service prioritization policy information including traffic flow tagging information and service priority information assigned to one or more traffic flows within a multi access point (MAP) network, wherein the traffic flow tagging information assigned to the one or more traffic flows comprises at least differentiated service (DS) field values, and wherein the traffic service prioritization policy information assigns a service priority value to at least one unclassified traffic flow tagged with a specific DS field value;
obtaining capability information from one or more agents of the MAP network; and
outputting the traffic service prioritization policy information for transmission to a MAP agent of the one or more agents of the MAP network in response to the capability information of the MAP agent indicating support, via a service prioritization bit in a message, for traffic classification into a distinct class for service prioritization.

15. The method of claim 14, wherein the service priority information assigned to each traffic flow comprises a priority defined according to the 802.1q standard.

16. The method of claim 14, wherein the traffic flow tagging information assigned to the one or more traffic flows further comprises virtual local area network identifiers (VIDs).

17. A method for wireless communications by an apparatus, comprising:
outputting, via a service prioritization bit for transmission in a message, capability information indicating that the apparatus supports traffic classification into a distinct class for service prioritization;
in response to outputting the capability information, obtaining traffic service prioritization policy information including traffic flow tagging information and service priority information assigned to one or more traffic flows within a multi access point (MAP) network, wherein the traffic flow tagging information assigned to the one or more traffic flows comprises at least differentiated service (DS) field values, and wherein the traffic service prioritization policy information assigns a service priority value to at least one unclassified traffic flow tagged with a specific DS field value; and
prioritizing traffic in the MAP network based on the traffic service prioritization policy information.

18. The method of claim 17, wherein the service priority information assigned to each traffic flow comprises a priority defined according to the 802.1q standard.

19. The method of claim 17, wherein the traffic flow tagging information assigned to the one or more traffic flows further comprises virtual local area network identifiers (VIDs).

20. The method of claim 19, wherein the VIDs are based on at least one of media access control (MAC) identifiers, internet protocol (IP) identifiers, Differentiated Services Code Point (DSCP) identifiers, or Transport Protocol identifiers.

21. The method of claim 17, wherein the traffic service prioritization policy information is output for transmission via a type length value (TLV).

22. The method of claim 21, further comprising determining which type of field values are assigned for tagging a certain traffic flow based on one or more bits in the TLV.

23. The method of claim 21, further comprising determining which type of field values are used as a classifier for a certain traffic flow based on one or more bits in the TLV.

24. The apparatus of claim 5, wherein the TLV is included within one of a MAP policy configuration request message and a Wi-Fi simple configuration (WSC) message.

25. The apparatus of claim 1, wherein the traffic service prioritization policy information is output to a plurality of MAP agents, and wherein the plurality of MAP agents route traffic, via at least one fronthaul link, to one or more user terminals based on the traffic service prioritization policy information.

26. The apparatus of claim 25, wherein the plurality of MAP agents form a group to route traffic to a user terminal, of the one or more user terminals, using over the air signaling without communicating over a backhaul.

27. The apparatus of claim 26, wherein the plurality of MAP agents obtain feedback information from the user terminal, the feedback information being related to wireless channels between each of the plurality of MAP agents and the user terminal, and wherein the plurality of MAP agents perform beamforming based on the feedback information to route traffic to the user terminal.

* * * * *